(12) United States Patent
Proctor et al.

(10) Patent No.: US 10,941,845 B2
(45) Date of Patent: Mar. 9, 2021

(54) POWER TRANSMITTING COMPONENT WITH LIMITED SLIP DIFFERENTIAL ASSEMBLY HAVING PRELOADED FRICTION CLUTCH

(71) Applicant: AMERICAN AXLE & MANUFACTURING, INC., Detroit, MI (US)

(72) Inventors: Shawn S. Proctor, Farmington Hills, MI (US); Douglas J. Chemelli, Royal Oak, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 1 day.

(21) Appl. No.: 16/393,986

(22) Filed: Apr. 25, 2019

(65) Prior Publication Data

US 2020/0340567 A1   Oct. 29, 2020

(51) Int. Cl.
*F16D 43/21*  (2006.01)
*F16D 43/30*  (2006.01)
(Continued)

(52) U.S. Cl.
CPC .......... *F16H 48/22* (2013.01); *F16D 43/216* (2013.01); *F16D 43/30* (2013.01); *F16H 48/08* (2013.01)

(58) Field of Classification Search
CPC ........ F16D 43/30; F16D 43/216; F16H 48/08; F16H 48/20; F16H 48/22; F16H 48/24; F16H 48/26; F16H 48/28; F16H 48/29; F16H 48/30; F16H 48/32; F16H 48/34; F16H 48/285; F16H 48/295;
(Continued)

(56) References Cited

U.S. PATENT DOCUMENTS 3,361,009 A  *  1/1968  Wojcikowski .......... F16H 48/08
                                                    475/235
3,390,593 A  *  7/1968  Brownyer .............. F16H 48/08
                                                    475/240
(Continued)

FOREIGN PATENT DOCUMENTS

JP   2001132820 A   5/2001

OTHER PUBLICATIONS

PCT International Search Report dated Jul. 29, 2020 for corresponding PCT application No. PCT/US2020/028969, filed Apr. 20, 2020.

*Primary Examiner* — Tisha D Lewis
(74) *Attorney, Agent, or Firm* — Burris Law, PLLC

(57) ABSTRACT

A driveline power transmitting component with a differential assembly having a differential input, first and second differential outputs, which are driven by the differential input, a first friction clutch, a first biasing spring and a second friction clutch. The first friction clutch has a friction plate that is non-rotatably but axially slidably coupled to the differential input. The first biasing spring urges the first friction clutch into an engaged condition in which the friction plate of the first friction clutch is frictionally engaged to the first differential output. The second friction clutch has a plurality of first clutch plates, which are axially slidably but non-rotatably coupled to the differential input, and a plurality of second clutch plates that interleaved with the first clutch plates and axially slidably but non-rotatably coupled to the first differential output.

14 Claims, 3 Drawing Sheets

(51) Int. Cl.
*F16H 48/22* (2006.01)
*F16H 48/20* (2012.01)
*F16H 48/08* (2006.01)

(58) Field of Classification Search
CPC ......... F16H 2048/201; F16H 2048/202; F16H 2048/204; F16H 2048/282; F16H 2048/305; F16H 2048/343; F16H 2048/346
See application file for complete search history.

(56) References Cited

U.S. PATENT DOCUMENTS

| | | | |
|---|---|---|---|
| 3,490,312 A * | 1/1970 | Dehart | F16H 48/22 475/88 |
| 3,929,036 A | 12/1975 | Shealy | |
| 5,741,199 A | 4/1998 | Tanser et al. | |
| 6,293,891 B1 | 9/2001 | Irwin et al. | |
| 8,506,441 B2 * | 8/2013 | Hultgren | F16H 48/34 475/231 |
| 2006/0046888 A1 * | 3/2006 | Puiu | B60K 17/16 475/151 |
| 2007/0261932 A1 | 11/2007 | Zagrodzki et al. | |
| 2014/0121056 A1 | 5/2014 | Kellogg | |
| 2014/0171252 A1 | 6/2014 | Creager | |
| 2015/0105209 A1 | 4/2015 | Cochren et al. | |
| 2017/0328460 A1 | 11/2017 | Schulte | |

* cited by examiner

POWER TRANSMITTING COMPONENT WITH LIMITED SLIP DIFFERENTIAL ASSEMBLY HAVING PRELOADED FRICTION CLUTCH

FIELD

The present disclosure relates to a power transmitting component with a limited slip differential assembly having a preloaded friction clutch.

BACKGROUND

This section provides background information related to the present disclosure which is not necessarily prior art.

Limited slip differential assemblies are employed to limit speed differentiation between the output members of a differential assembly under certain conditions. Typically, a limited slip differential assembly will include one or more friction clutches or clutch packs, with each clutch pack providing a torque-carrying interface between a differential input, such as a differential case and one of the differential output members, such as a side gear. A spring can be employed to pre-load the clutch pack to provide a desired minimum torque-carrying capacity. While such pre-loaded limited slip differential assembly configurations are satisfactory for their intended purposes, the fixed minimum torque threshold for slippage between the differential input and the differential outputs can be disadvantageous in some situations.

SUMMARY

This section provides a general summary of the disclosure, and is not a comprehensive disclosure of its full scope or all of its features.

In one form, the present disclosure provides a driveline power transmitting component having a differential assembly with a differential input, first and second differential outputs, which are driven by the differential input, a first friction clutch, a first biasing spring and a second friction clutch. The first friction clutch has at least one friction plate that is non-rotatably but axially slidably coupled to the differential input. The first biasing spring urges the first friction clutch into an engaged condition in which the at least one friction plate of the first friction clutch is frictionally engaged to the first differential output to thereby resist relative rotation between the first differential output and the differential input. The second friction clutch has a plurality of first clutch plates, which are axially slidably but non-rotatably coupled to the differential input, and a plurality of second clutch plates that interleaved with the first clutch plates and axially slidably but non-rotatably coupled to the first differential output.

In some forms, the differential input is a differential case that houses the first and second differential outputs. Optionally, the differential assembly also includes a differential gearset having a first side gear, which is rotatably coupled to the first differential output, and a second side gear that is rotatably coupled to the second differential output. In some forms, the first side gear and the first differential output are fixedly coupled to one another.

In some forms, the first and second friction clutches are disposed in series between the first differential output and an axial end of the differential input.

In some forms, the driveline power transmitting component also includes a third friction clutch, a second biasing spring and a fourth friction clutch. The third friction clutch has at least one friction plate that is non-rotatably but axially slidably coupled to the differential input. The second biasing spring urges the third friction clutch into an engaged condition in which the at least one friction plate of the third friction clutch is frictionally engaged to the second differential output to thereby resist relative rotation between the second differential output and the differential input. The fourth friction clutch has a plurality of third clutch plates, which are axially slidably but non-rotatably coupled to the differential input, and a plurality of fourth clutch plates that interleaved with the third clutch plates and axially slidably but non-rotatably coupled to the second differential output. Optionally, the third and fourth friction clutches are disposed in series between the first differential output and an axial end of the differential input.

In another form, the present disclosure provides a driveline power transmitting component that includes a differential assembly having a differential case, a differential gearset and a pair of clutch assemblies. The differential gearset is received in the differential case and has a pair of side gears. Each of the clutch assemblies is coupled to the differential case and an associated one of the side gears. Each of the clutch assemblies is disposed in a torque path between the differential case and an associated one of the side gears. The differential assembly has a torque bias ratio that varies as a function of a magnitude of a torque that is transmitted from the differential case to the side gears. The clutch assemblies are configured to create a step in the function in which the torque bias ratio increases with an increase in the magnitude of the torque. Prior to the step in the function, the torque bias ratio decreases with an increase in the magnitude of the torque. After the step in the function, the torque bias ratio decreases with an increase in the magnitude of the torque.

In still another form, the present disclosure provides a driveline power transmitting component having an input member, a differential case driven by the input member, a differential gearset and a pair of clutch assemblies. The differential case defines a cavity and is rotatable about an output axis. The differential gearset is received in the cavity and includes a pair of side gears that are rotatable relative to the differential case about the output axis. The clutch assemblies received in the cavity and each have a first friction clutch, a biasing spring and a second friction clutch. The first friction clutch of each clutch assembly has at least one friction plate that is non-rotatably but axially slidably coupled to the differential case. The first biasing spring urges the at least one friction plate into engagement with an associated one of the side gears to resist relative rotation between the first side gear and the differential case. The second friction clutch has a plurality of first clutch plates, which are axially slidably but non-rotatably coupled to the differential case, and a plurality of second clutch plates that are interleaved with the first clutch plates and axially slidably but non-rotatably coupled to the associated one of the side gears.

In some forms, the input member is an input pinion shaft, an input pinion is coupled to the input pinion shaft for rotation therewith, and a ring gear is meshed with the input pinion and rotationally coupled to the differential case.

In some forms, the biasing spring of each of the clutch assemblies includes a plurality of spring elements that are circumferentially spaced apart from one another about the output axis. Optionally, the spring elements comprise helical compression springs.

In some forms, the differential gearset includes a plurality of differential pinions that are rotatably mounted on a cross-pin and meshingly engaged with the side gears. Optionally, the cross-pin is rotatably coupled to the differential case.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
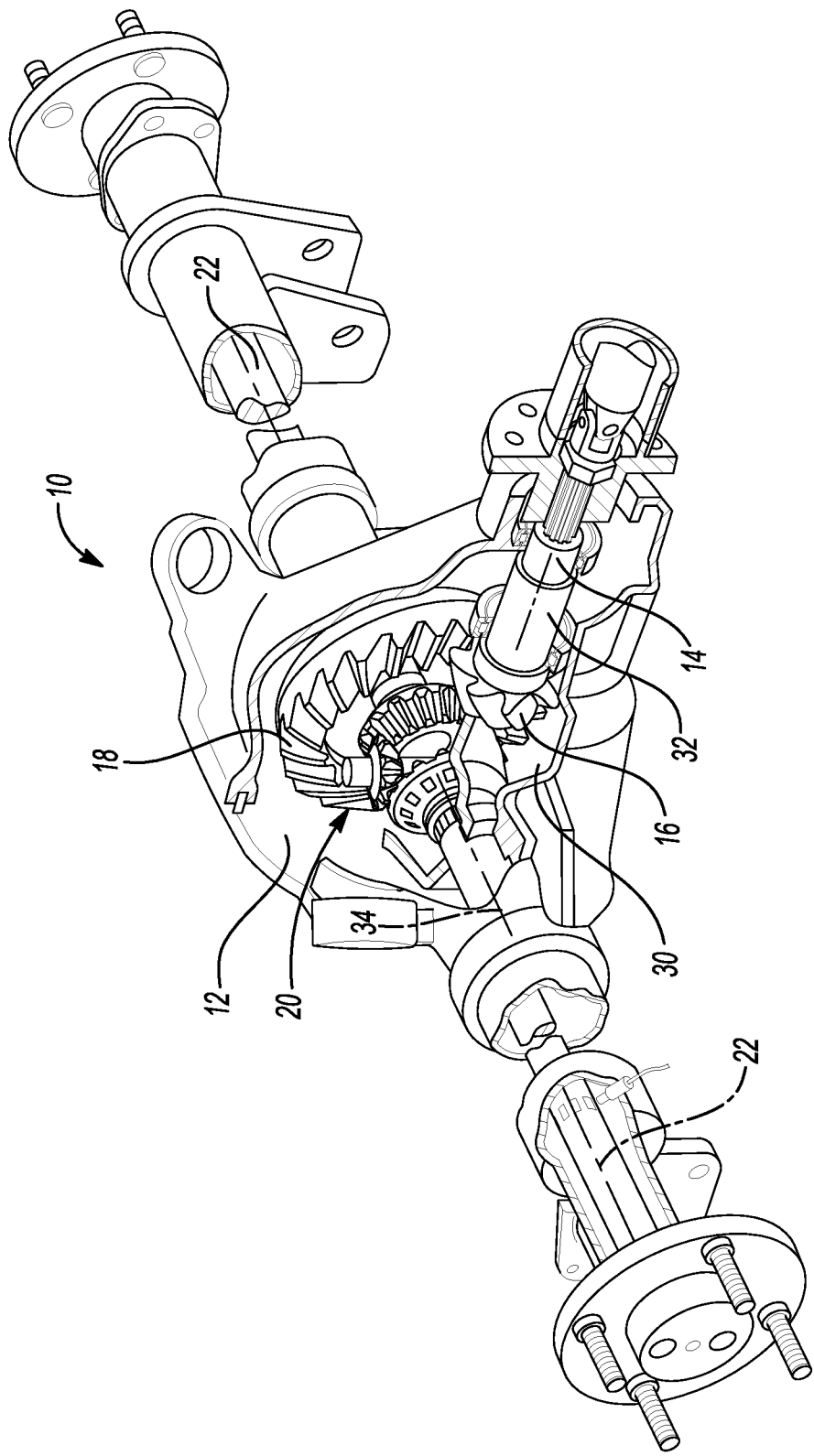
FIG. 1 is a perspective, partly sectioned view of an exemplary vehicle driveline component constructed in accordance with the teachings of the present disclosure.

With reference to FIG. 1, an exemplary driveline power transmitting component constructed in accordance with the teachings of the present disclosure is generally indicated by reference numeral 10. In the particular example provided, the driveline power transmitting component 10 is a rear axle assembly, but it will be appreciated that the teachings of the present disclosure can be employed in various other driveline power transmitting components, including front axle assemblies, transfer cases, center differentials and power take-off units. In the example provided, the driveline power transmitting component 10 can include a housing 12, an input member 14, an input pinion 16, a ring gear 18, a differential assembly 20 and a pair of output shafts 22.

The housing 12 can define a cavity 30 into which the input member 14, the input pinion 16, the ring gear 18 and the differential assembly 20 can be received. The housing 12 can support the input member 14 for rotation about an input axis 32. The input member 14 is configured as a shaft in the example provided, and the input pinion 16 can be coupled to the input member 14 for rotation therewith about the input axis 32. The ring gear 18 can be meshingly engaged with the input pinion 16 and can be rotatable about an output axis 34 that can be transverse (e.g., perpendicular) to the input axis 32.

Figure 2:
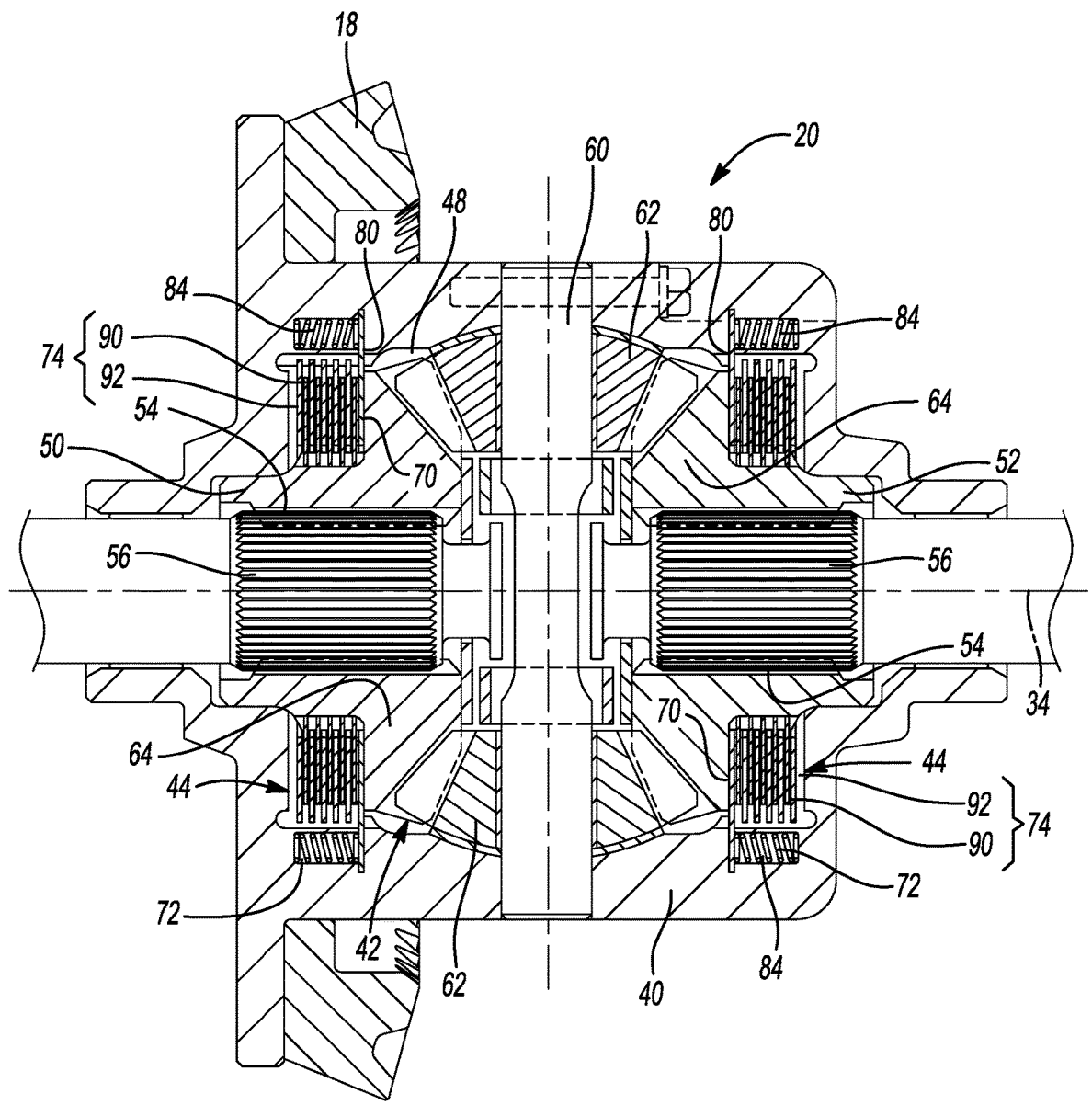
FIG. 2 is a lateral section view of a portion of the vehicle driveline component of FIG. 1 illustrating a differential assembly in more detail.

With reference to FIG. 2, the differential assembly 20 can include a differential input 40, a differential gearset 42 and a pair of clutch assemblies 44.

The differential input 40 can be rotatably coupled to the ring gear 18 and can be supported by the housing 12 (FIG. 1) for rotation about the output axis 34. In the example provided, the differential input 40 is a differential case that defines a case cavity 48 into which the differential gearset 42 and the clutch assemblies 44 can be received.

The differential gearset 42 can have first and second differential outputs 50 and 52, respectively, that can be driven by the differential input 40. Each of the first and second differential outputs 50 and 52 has an internally toothed or splined aperture 54 that is configured to axially slidably but non-rotatably engage a male splined segment 56 on an associated one of the output shafts 22.

The differential gearset 42 can be configured with helical gears and/or could be configured as a planetary gearset. In the example provided, the differential gearset 42 includes a cross-pin 60, a plurality of differential pinions 62 and a pair of side gears 64. The cross-pin 60 can be rotatably coupled to the differential input 40 and can extend through the case cavity 48 along an axis that is perpendicular to the output axis 34. The differential pinions 62 can be configured as straight bevel gears and can be received in the case cavity 48 and mounted for rotation on the cross-pin 60. Each of the side gears 64 can be a straight bevel gear that can be received in the case cavity 48 for rotation about the output axis 34 and can be meshingly engaged with the differential pinions 62. Each of the side gears 64 can be rotatably coupled, and optionally fixedly coupled, to an associated one of the first and second differential outputs 50 and 52. In the example provided, each of the side gears 64 is integrally and unitarily formed with an associated one of the first and second differential outputs 50 and 52.

Each of the clutch assemblies 44 can include a first friction clutch 70, a biasing spring 72 and a second friction clutch 74. The first friction clutch 70 can have at least one friction plate 80 that is non-rotatably but axially slidably coupled to the differential input 40. If desired, the first friction clutch 70 can have a plurality of first friction plates, which can be non-rotatably but axially slidably coupled to the differential input 40, and a plurality of second friction plates that can be non-rotatably but axially slidably coupled to one of the first and second differential outputs 50 and 52.

The biasing spring 72 can be disposed between the differential input 40 and the first friction clutch 70 and can urge the first friction clutch 70 into an engaged condition in which the at least one friction plate 80 is frictionally engaged to an associated one of the first and second differential outputs 50 and 52 to thereby resist relative rotation between the associated one of the first and second differential outputs 50 and 52 and the differential input 40. In this regard, the biasing spring 72 preloads the first friction clutch 70 so that relative rotation between the associated one of the first and second differential outputs 50 and 52 and the differential input 40 is inhibited if a difference between the magnitude of the torque that is input to the differential input 40 and the magnitude of the torque that is output from the associated one of the first and second differential outputs 50 and 52 is less than or equal to a first torque threshold. The biasing spring 72 can comprise one or more spring elements 84, and each of which can be configured as a wave spring or helical coil compression spring. In the example provided, the biasing spring 72 comprises a plurality of spring elements 84 that are configured as helical coil compression springs and which are received in the case cavity 48 and spaced circumferentially apart from one another about the output axis 34.

The second friction clutch 74 can have a plurality of first clutch plates 90, which are axially slidably but non-rotatably coupled to the differential input 40, and a plurality of second clutch plates 92 that are interleaved with the first clutch plates 90 and axially slidably but non-rotatably coupled to the associated one of the first and second differential outputs 50 and 52. The second friction clutch 74 can be disposed on a side of the first friction clutch 70 that is opposite the associated one of the first and second differential outputs 50 and 52. The first and second clutch plates 90 and 92 of the second friction clutch 74 are not biased into engagement and as such, the second friction clutch 74 has no or relatively little impact on the operation of the differential assembly 20 when relatively little torque is transmitted from the differential input 40 to the associated one of the first and second differential outputs 50 and 52.

In operation, the first friction clutch 70 inhibits relative rotation between the differential input 40 and an associated one of the first and second differential outputs 50 and 52 until the magnitude of the torque that is transmitted through the first friction clutch 70 exceeds a first predetermined threshold. As the magnitude of the torque that is transmitted from the differential input 40 to the first and second differential outputs 50 and 52 increases, thrust forces acting on the first and second differential outputs 50 and 52 tend to drive the first and second differential outputs 50 and 52 axially along the output axis 34 away from one another. When the thrust forces are sufficiently large, the thrust forces will overcome the biasing springs 72 and will drive the first and second clutch plates 90 and 92 of the second friction clutches 74 into frictional engagement with one another.

Figure 3:
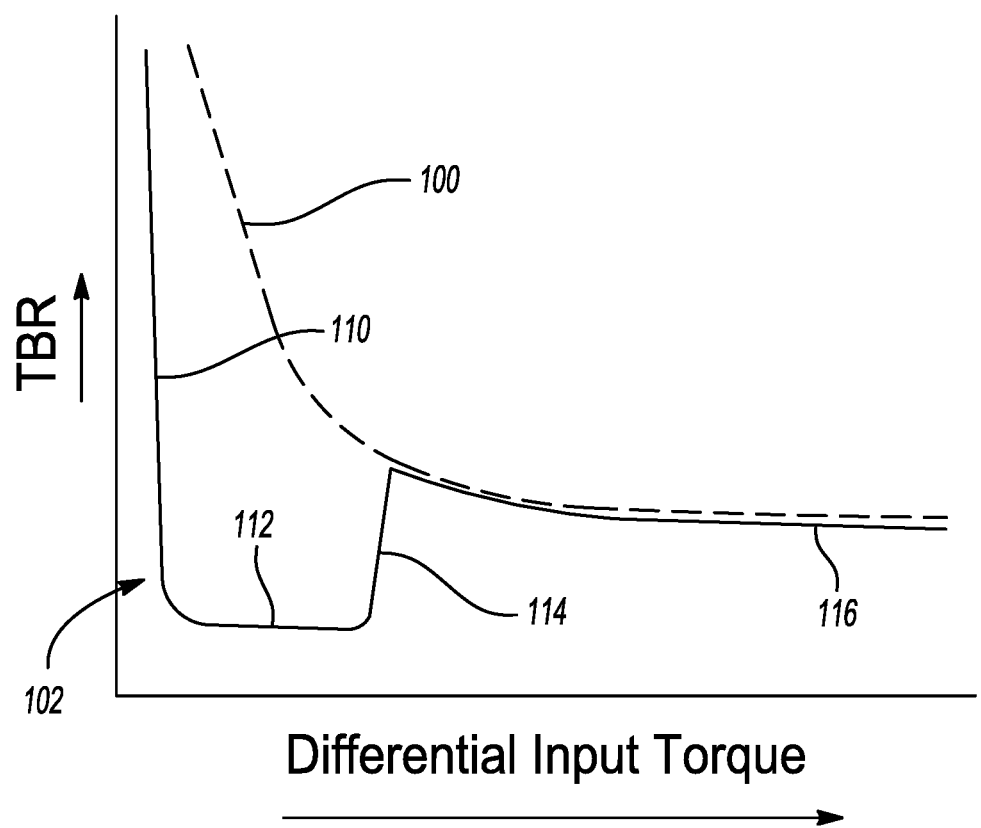
FIG. 3 is a schematic illustration depicting TBR versus differential input torque for a prior art differential assembly and a differential assembly constructed in accordance with the teachings of the present disclosure.

With reference to FIG. 3, a first plot 100 depicts the torque bias ratio (TBR) of a prior art limited slip differential assembly as a function of the magnitude of the torque that is input to the prior art limited slip differential assembly. The prior art limited slip differential assembly is a conventional preloaded limited slip differential assembly having a (single) friction clutch that is preloaded with a preload spring. The first plot 100 generally follows a function in which TBR is inversely related to the square of the magnitude of the torque (i.e., TBR=$1/(TQ)^2$+C, where TQ is the magnitude of the differential input torque and C is a constant) that is input to the prior art limited slip differential assembly.

A second plot 102 depicts the TBR of the limited slip differential assembly constructed in accordance with the teachings of the present disclosure. The second plot 102 has four distinct segments 110, 112, 114 and 116. Segment 110 is extremely steep relative to a corresponding section of the first plot 100, with the difference being attributed to the relatively low torque capacity of the first friction clutch 70 (FIG. 2). Segment 112 occurs where the thrust forces on the first and second differential outputs 50 and 52 (FIG. 2) are driving the first and second differential outputs 50 and 52 (FIG. 2) away from one another and compressing the biasing spring 72 (FIG. 2). Segment 114 occurs where the thrust forces on the first and second differential outputs 50 and 52 (FIG. 2) are driving the first and second clutch plates 90 and 92 (FIG. 2) into engagement with one another. Segment 116 occurs where the thrust forces on the first and second differential outputs 50 and 52 (FIG. 2) is greater than or equal to that which is required to fully engage the first and second clutch plates 90 and 92 (FIG. 2) of the second friction clutch 74 (FIG. 2) into engagement with one another.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A driveline power transmitting component comprising: a differential assembly having a differential input, first and second differential outputs, which are driven by the differential input, a first friction clutch, a first biasing spring and a second friction clutch, the first friction clutch having at least one friction plate that is non-rotatably but axially slidably coupled to the differential input, the first biasing spring urging the first friction clutch into an engaged condition in which the at least one friction plate of the first friction clutch is frictionally engaged to the first differential output to thereby resist relative rotation between the first differential output and the differential input, the second friction clutch having a plurality of first clutch plates, which are axially slidably but non-rotatably coupled to the differential input, and a plurality of second clutch plates that interleaved with the first clutch plates and axially slidably but non-rotatably coupled to the first differential output.

2. The driveline power transmitting component of claim 1, wherein the differential input is a differential case that houses the first and second differential outputs.

3. The driveline power transmitting component of claim 2, wherein the differential assembly further comprises a differential gearset having a first side gear, which is rotatably coupled to the first differential output, and a second side gear that is rotatably coupled to the second differential output.

4. The driveline power transmitting component of claim 3, wherein the first side gear and the first differential output are fixedly coupled to one another.

5. The driveline power transmitting component of claim 1, wherein the first and second friction clutches are disposed in series between the first differential output and an axial end of the differential input.

6. The driveline power transmitting component of claim 1, further comprising a third friction clutch, a second biasing spring and a fourth friction clutch, the third friction clutch having at least one friction plate that is non-rotatably but axially slidably coupled to the differential input, the second biasing spring urging the third friction clutch into an engaged condition in which the at least one friction plate of the third friction clutch is frictionally engaged to the second differential output to thereby resist relative rotation between the second differential output and the differential input, the fourth friction clutch having a plurality of third clutch plates, which are axially slidably but non-rotatably coupled to the differential input, and a plurality of fourth clutch plates that interleaved with the third clutch plates and axially slidably but non-rotatably coupled to the second differential output.

7. The driveline power transmitting component of claim 6, wherein the third and fourth friction clutches are disposed in series between the second differential output and an axial end of the differential input.

8. The driveline power transmitting component of claim 1, wherein the differential input is a differential case, wherein the differential assembly includes a differential gearset that is received in the differential case, wherein the differential gearset includes first and second side gears, the first side gear being the first differential output, the second side gear being the second differential output, the first friction clutch being disposed in a first torque path between the differential case and the first side gear, the second friction clutch being disposed in a second torque path between the differential case and the first side gear;

wherein the differential assembly has a torque bias ratio that varies as a function of a magnitude of a torque that is transmitted from the differential case to the first and second side gears, wherein the first and second friction clutches are configured to create a step in the function in which the torque bias ratio increases with an increase in the magnitude of the torque, wherein prior to the step in the function the torque bias ratio decreases with an increase in the magnitude of the torque, and wherein after the step in the function the torque bias ratio decreases with an increase in the magnitude of the torque.

9. A driveline power transmitting component comprising:
an input member;
a differential case driven by the input member, the differential case defining a cavity and being rotatable about an output axis;
a differential gearset received in the cavity, the differential gearset having a pair of side gears that are rotatable relative to the differential case about the output axis;
a pair of clutch assemblies received in the cavity, each of the clutch assemblies having a first friction clutch, a biasing spring and a second friction clutch, the first friction clutch having at least one friction plate that is non-rotatably but axially slidably coupled to the differential case, the biasing spring urging the at least one friction plate into engagement with an associated one of the side gears to resist relative rotation between the associated one of the side gears and the differential case, the second friction clutch having a plurality of first clutch plates, which are axially slidably but non-rotatably coupled to the differential case, and a plurality of second clutch plates that interleaved with the first clutch plates and axially slidably but non-rotatably coupled to the associated one of the side gears.

10. The power transmitting component of claim 9, wherein the input member comprises an input pinion shaft and wherein the power transmitting component further comprises an input pinion, which is coupled to the input pinion shaft for rotation therewith, and a ring gear that is meshed with the input pinion and rotationally coupled to the differential case.

11. The power transmitting component of claim 9, wherein the biasing spring of each of the clutch assemblies comprises a plurality of spring elements that are circumferentially spaced apart from one another about the output axis.

12. The power transmitting component of claim 11, wherein the spring elements comprise helical compression springs.

13. The power transmitting component of claim 9, wherein the differential gearset further comprises a plurality of differential pinions that are rotatably mounted on a cross-pin, the differential pinions being meshingly engaged with the side gears.

14. The power transmitting component of claim 13, wherein the cross-pin is coupled to the differential case for rotation therewith about the output axis.

* * * * *